(12) United States Patent
Shinozaki

(10) Patent No.: US 10,847,818 B2
(45) Date of Patent: Nov. 24, 2020

(54) COOLING AND HUMIDIFYING DEVICE AND FUEL CELL SYSTEM HAVING THE SAME

(71) Applicant: TOYOTA JIDOSHA KABUSHIKI KAISHA, Toyota (JP)

(72) Inventor: Yoshihiro Shinozaki, Atsugi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 127 days.

(21) Appl. No.: 16/126,272

(22) Filed: Sep. 10, 2018

(65) Prior Publication Data
US 2019/0081335 A1    Mar. 14, 2019

(30) Foreign Application Priority Data

Sep. 12, 2017    (JP) ................................. 2017-175197

(51) Int. Cl.
| | | |
|---|---|---|
| *H01M 8/04* | (2016.01) | |
| *H01M 8/04119* | (2016.01) | |
| *H01M 8/04701* | (2016.01) | |
| *H01M 8/04828* | (2016.01) | |
| *H01M 8/04014* | (2016.01) | |

(52) U.S. Cl.
CPC ... *H01M 8/04141* (2013.01); *H01M 8/04014* (2013.01); *H01M 8/04708* (2013.01); *H01M 8/04835* (2013.01)

(58) Field of Classification Search
CPC ......... H01M 8/04141; H01M 8/04014; H01M 8/04835; H01M 8/04708; H01M 8/04253; H01M 8/04149; H01M 8/04029; H01M 8/04228
USPC ......................................................... 429/414
See application file for complete search history.

(56) References Cited

U.S. PATENT DOCUMENTS

| | | | |
|---|---|---|---|
| 2008/0102335 A1 | 5/2008 | Skala | |
| 2015/0004504 A1* | 1/2015 | Bardeleben | ....... H01M 8/04164 429/413 |

FOREIGN PATENT DOCUMENTS

| | | |
|---|---|---|
| JP | 2008108473 A | 5/2008 |
| JP | 2008108730 A | 5/2008 |

\* cited by examiner

*Primary Examiner* — Gary D Harris
(74) *Attorney, Agent, or Firm* — Hunton Andrews Kurth LLP

(57) ABSTRACT

A cooling and humidifying device includes: a cooling portion cooling cathode gas by exchanging heat between the cathode gas and coolant; a humidifying portion including a moisture permeable member and humidifying the cathode gas by use of moisture contained in cathode off-gas; and a case housing the cooling portion and the humidifying portion.

9 Claims, 12 Drawing Sheets

COOLING AND HUMIDIFYING DEVICE AND FUEL CELL SYSTEM HAVING THE SAME

CROSS-REFERENCE TO RELATED APPLICATION

This application is based upon and claims the benefit of priority of the prior Japanese Patent Application No. 2017-175197, filed on Sep. 12, 2017, the entire contents of which are incorporated herein by reference.

FIELD OF THE INVENTION

The present invention relates to a cooling and humidifying device and a fuel cell system having the same.

BACKGROUND

There is known a fuel cell system including a cooler for cooling cathode gas to be supplied to a fuel cell and a humidifier for humidifying the cathode gas. For example, in Japanese Unexamined Patent Application Publication No. 2008-108473, a cooler and a humidifier are integrated with each other, and moisture contained in the cathode off-gas moves to a cathode side through a moisture permeable member in the humidifier, which humidifies the cathode gas.

If the fuel cell system stops with condensed water adhering to such a moisture permeable member, the condensed water may freeze on the moisture permeable member depending on an outside air temperature, which may damage the moisture permeable member. Also, the cathode gas may blow away such condensed water, which may excessively humidify the cathode gas.

SUMMARY OF THE INVENTION

It is an object of the present invention to provide a cooling and humidifying device which improves drainage from a moisture permeable member and suppresses excessive humidification of cathode gas, and a fuel cell system having the same.

The above object is achieved by a cooling and humidifying device including: a cooling portion including: a coolant flow path through which a coolant flows; a first cathode gas flow path through which cathode gas to be supplied to a fuel cell flows; and a partition wall separating the coolant flow path from the first cathode gas flow path, the cooling portion configured to cool the cathode gas by exchanging heat between the cathode gas and the coolant; a humidifying portion including: a second cathode gas flow path through which the cathode gas flows; a cathode off-gas flow path through which cathode off-gas discharged from the fuel cell flows; and at least one of first and second moisture permeable members each separating the second cathode gas flow path from the cathode off-gas flow path, the humidifying portion configured to humidify the cathode gas by use of moisture contained in the cathode off-gas; and a case including a cathode gas inlet communicating with the first cathode gas flow path, and housing the cooling portion and the humidifying portion such that the first and second cathode gas flow paths communicating with each other and that the second cathode gas flow path is positioned vertically above the first cathode gas flow path, wherein the first moisture permeable member has a tubular shape defining the second cathode gas flow path on an inside of the first moisture permeable member, and an axial direction of the tubular shape intersects a horizontal direction and extends toward the cooling portion, the second moisture permeable member has a planar shape defining the second cathode gas flow path on one side of the second moisture permeable member, and a planer surface of the planar shape intersects the horizontal direction and extends toward the cooling portion, the case includes a lower wall positioned vertically below the cooling portion, and the cathode gas inlet is positioned vertically above at least a part of an inner surface of the lower wall and vertically below the cooling portion.

With the above configuration, the condensed water generated in the second cathode gas flow path drops from the moisture permeable member to the cooling portion by gravity, thereby improving drainage from the moisture permeable member. Also, with the above configuration, the condensed water dropping from the moisture permeable member on the inner surface of the lower wall through the first cathode gas flow path. Since the cathode gas is introduced into the case from vertically above at least a part of the inner surface of the lower wall, the cathode gas is prevented from blowing away the condensed water staying on the inner surface of the lower wall. Therefore, excessive humidification of the cathode gas is suppressed.

The lower wall may include a water storage portion including a recessed portion recessed vertically downward.

A first drain valve discharging water, stored on the lower wall, to an outside of the case may be included.

A first drain valve draining water, stored in the water storage portion, to an outside of the case may be included.

A sensor detecting an amount of water stored on the lower wall may be included, wherein the first drain valve may be controlled to open and close according to a detection result of the sensor.

The case may include an off-gas inlet and an off-gas outlet communicating with the cathode off-gas flow path, the humidifying portion may include an off-gas flow path bottom surface defining the cathode off-gas flow path, and the off-gas flow path bottom surface may be inclined diagonally downward from the off-gas inlet to the off-gas outlet.

The case may include an off-gas outlet communicating with the cathode off-gas flow path, the humidifying portion may include an off-gas flow path bottom surface defining the cathode off-gas flow path, and the off-gas outlet may be provided at a height equal to or lower than a height of the off-gas flow path bottom surface.

A second drain valve discharging water from the cathode off-gas flow path to an outside of the case may be included.

The coolant may cool the fuel cell.

The above object is achieved by a fuel cell system includes: a fuel cell; and a cooling and humidifying device, wherein the cooling and humidifying device includes: a cooling portion including: a coolant flow path through which a coolant flows; a first cathode gas flow path through which cathode gas to be supplied to the fuel cell flows; and a partition wall separating the coolant flow path from the first cathode gas flow path, the cooling portion configured to cool the cathode gas by exchanging heat between the cathode gas and the coolant; a humidifying portion including: a second cathode gas flow path through which the cathode gas flows; a cathode off-gas flow path through which cathode off-gas discharged from the fuel cell flows; and at least one of first and second moisture permeable members each separating the second cathode gas flow path from the cathode off-gas flow path, the humidifying portion configured to humidify the cathode gas by use of moisture contained in the cathode off-gas; and a case including a cathode gas inlet communicating with the first cathode gas flow path, and housing the cooling portion and the humidifying portion such that the first and second cathode gas flow paths communicating with each other and that the second cathode gas flow path is positioned vertically above the first cathode gas flow path, the first moisture permeable member has a tubular shape defining the second cathode gas flow path on an inside of the first moisture permeable member, and an axial direction of the tubular shape intersects a horizontal direction and extends toward the cooling portion, the second moisture permeable member has a planar shape defining the second cathode gas flow path on one side of the second moisture permeable member, and a planer surface of the planar shape intersects the horizontal direction and extends toward the cooling portion, the case includes a lower wall positioned vertically below the cooling portion, and the cathode gas inlet is positioned vertically above at least a part of an inner surface of the lower wall and vertically below the cooling portion.

DETAILED DESCRIPTION

Figure 1:
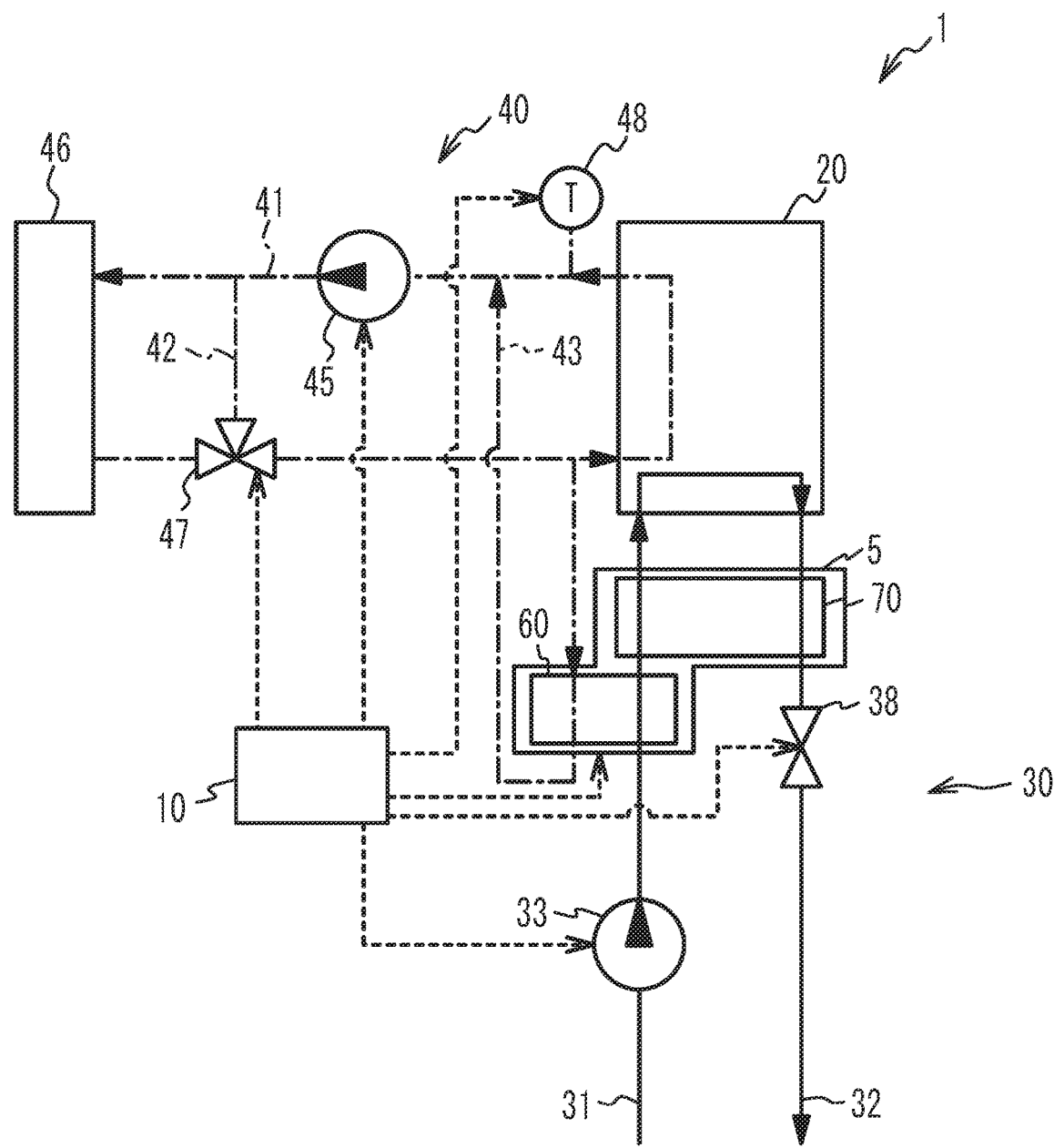
FIG. 1 is a schematic view of a fuel cell system.

FIG. 1 is a schematic view of a fuel cell system 1 (hereinafter, referred to as a system). The system 1 includes a control device 10, a fuel cell 20, an air supply system 30, a cooling system 40, and the like. The system 1 supplies electric power generated by the fuel cell 20 to a motor (not illustrated) and the like. The control device 10 is a computer including a CPU, a ROM, a RAM and the like, is electrically connected to devices described later, and controls the entire system 1. Additionally, the system 1 includes a hydrogen gas supply system (not illustrated) for supplying hydrogen to the fuel cell 20, and a power control system for controlling electric power generated by the fuel cell 20.

The air supply system 30 includes a supply path 31, a discharge path 32, a compressor 33, a cooling and humidifying device 5, and a back pressure valve 38. The air supply system 30 supplies air to the fuel cell 20 and is configured as follows. The air containing oxygen taken from the atmosphere (cathode gas) is compressed by the compressor 33 via the supply path 31, is cooled by a cooling portion 60 of the cooling and humidifying device 5 described later in detail, and is supplied to the fuel cell 20. The discharge path 32 discharges the cathode off-gas discharged from the fuel cell 20 to the atmosphere. The back pressure valve 38 adjusts the back pressure on the cathode side of the fuel cell 20. A humidifying portion 70 of the cooling and humidifying device 5 described later in detail humidifies the cathode gas passing through the supply path 31 by use of moisture contained in the cathode off-gas passing through the discharge path 32. The compressor 33, the cooling portion 60, and the humidifying portion 70 are arranged on the supply path 31 in this order from the upstream side. The humidifying portion 70 and the back pressure valve 38 are arranged on the discharge path 32 in this order from the upstream side. The cathode gas compressed by the compressor 33 is increased in temperature.

The cooling system 40 circulates cooling water as coolant through predetermined paths so as to cool the fuel cell 20, and is configured as follows. The coolant is circulated through a circulation path 41 by a circulation pump 45, is heat-exchanged and cooled by a radiator 46, and is supplied to the fuel cell 20. A bypass path 42 branches off from the circulation path 41 and bypasses the radiator 46. A three-way valve 47 adjusts the flow rate of the coolant flowing through the bypass path 42. A distribution path 43 is branched off from the circulation path 41 and is connected to the cooling portion 60, and is connected to the circulation path 41 again. The air passing through the cooling portion 60 is cooled by the coolant. A temperature sensor 48 detects the temperature of the coolant discharged from the fuel cell 20. Further, the distribution path 43 branches off from the circulation path 41 on the upstream side of the fuel cell 20 and on the downstream side of the three-way valve 47, and joins the circulation path 41 on the downstream side of the fuel cell 20 and on the upstream side of the circulation pump 45.

Figure 2:
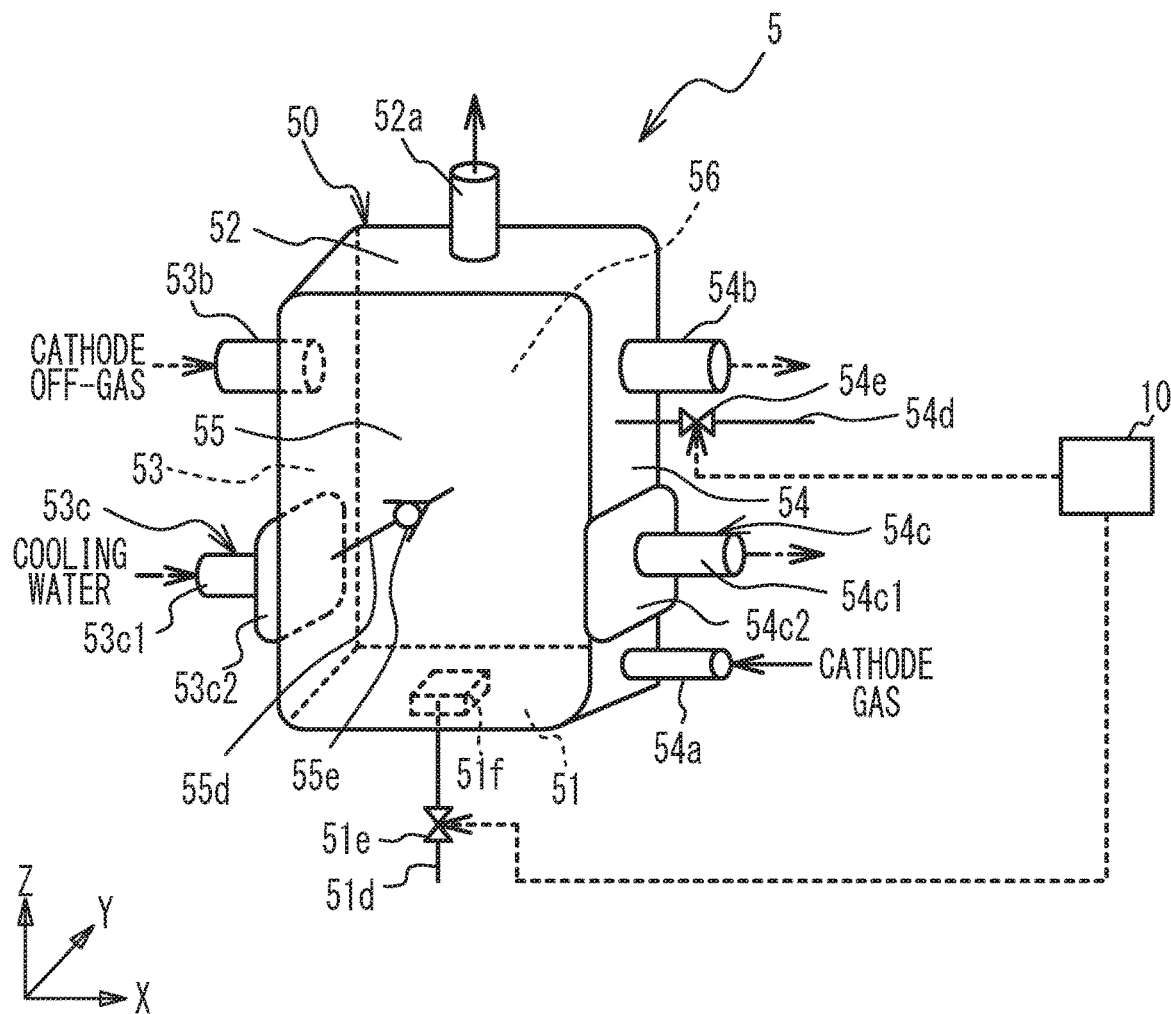
FIG. 2 is a schematically perspective view illustrating appearance of a cooling and humidifying device.

FIG. 2 is a schematically perspective view illustrating appearance of the cooling and humidifying device 5. Additionally, the cooling and humidifying device 5 schematically illustrated in FIG. 1 differs in shape from the cooling and humidifying device 5 illustrated in FIG. 2, but the shape of the cooling and humidifying device 5 is not limited to the shape illustrated in FIG. 2. The Z direction illustrated in FIG. 2 indicates the vertical direction. Each of the X direction and the Y direction indicates the horizontal direction. In FIG. 2 and the following drawings, a solid arrow indicates the direction in which the cathode gas flows, a dotted arrow indicates the direction in which the cathode off-gas flows, and an alternate long and short dashed arrow indicates the direction in which the cooling water flows.

The cooling and humidifying device 5 includes a case 50 that houses the cooling portion 60 and the humidifying portion 70. The case 50 has a substantially rectangular parallelepiped shape, and includes a lower wall 51, an upper wall 52, a left wall 53, a right wall 54, a front wall 55, and a rear wall 56. The lower wall 51 and the upper wall 52 face each other in the Z direction and are parallel to each other. Likewise, the left wall 53 and the right wall 54 face each other in the X direction and are parallel to each other. The front wall 55 and the rear wall 56 face each other in the Y direction and are parallel to each other. The lower wall 51 is provided with a water storage portion 51f. The water storage portion 51f is connected with a first drain pipe 51d. The first drain pipe 51d is provided with a first drain valve 51e. The upper wall 52 is provided with a cathode gas outlet (hereinafter referred to as a gas outlet) 52a. The left wall 53 is provided with a cathode off-gas inlet (hereinafter referred to as an off-gas inlet) 53b and a coolant inlet portion 53c. The right wall 54 is provided with a cathode gas inlet (hereinafter referred to as a gas inlet) 54a, a cathode off-gas outlet (hereinafter referred to as an off-gas outlet) 54b, and a coolant outlet portion 54c. A second drain pipe 54d is connected to the right wall 54. The second drain pipe 54d is provided with a second drain valve 54e. The first drain valve 51e and the second drain valve 54e are solenoid valves electrically connected to and controlled by the control device 10. The front wall 55 is connected with a pressure regulating pipe 55d. The pressure regulating pipe 55d is provided with a check valve 55e.

The coolant inlet portion 53c and the coolant outlet portion 54c are provided at substantially the same height position in the vertical direction. Likewise, the off-gas inlet 53b and the off-gas outlet 54b are provided at substantially the same height position in the vertical direction, but are positioned vertically above the coolant inlet portion 53c and the coolant outlet portion 54c. The gas inlet 54a is positioned vertically below the coolant outlet portion 54c. The second drain pipe 54d is positioned vertically above the coolant outlet portion 54c and vertically below the off-gas outlet 54b. The pressure regulating pipe 55d is connected to the front wall 55 at a position slightly lower than the second drain pipe 54d.

The coolant inlet portion 53c includes a tubular portion 53c1 and an enlarged portion 53c2. The enlarged portion 53c2 communicates with the tubular portion 53c1, has a diameter greater than that of the tubular portion 53c1, and is connected to the left wall 53. Likewise, the coolant outlet portion 54c includes a tubular portion 54c1 and an enlarged portion 54c2. The enlarged portion 54c2 communicates with the tubular portion 54c1, has a diameter greater than that of the tubular portion 54c1, and is connected to the right wall 54.

The cathode gas is introduced into the case 50 from the gas inlet 54a, flows vertically upward within the case 50, and is discharged from the gas outlet 52a. The cathode off-gas is introduced into the case 50 from the off-gas inlet 53b, flows within the case 50 in the +X direction, and is discharged from the off-gas outlet 54b. The cooling water of the coolant is introduced into the case 50 from the coolant inlet portion 53c, flows in the +X direction, and is discharged from the coolant outlet portion 54c. The gas inlet 54a and the gas outlet 52a configure a part of the supply path 31 described above. The off-gas inlet 53b and the off-gas outlet 54b configure a part of the discharge path 32. The coolant inlet portion 53c and the coolant outlet portion 54c configure a part of the distribution path 43.

Figure 3:
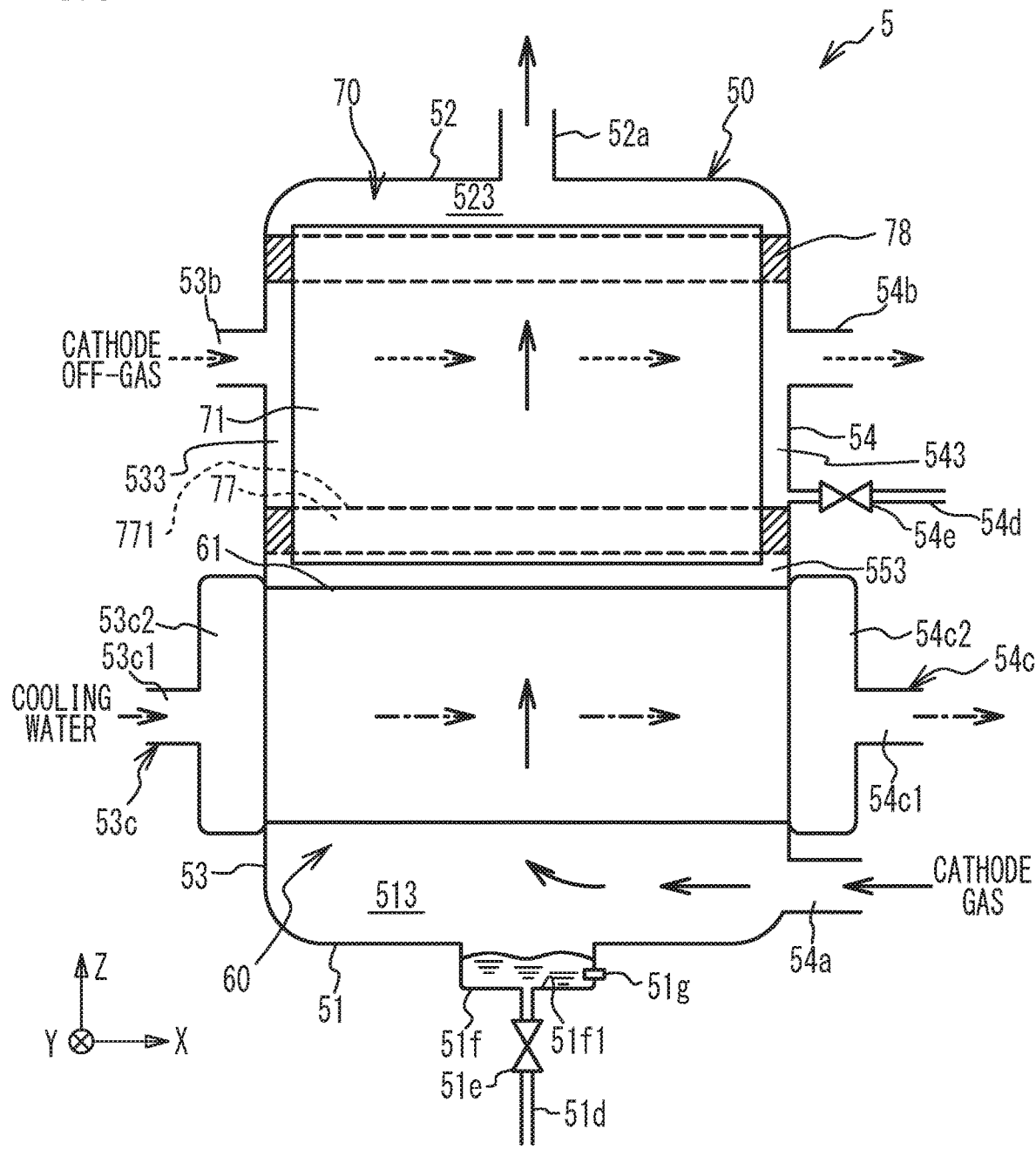
FIG. 3 is a view illustrating an inner configuration of a case.
Figure 4:
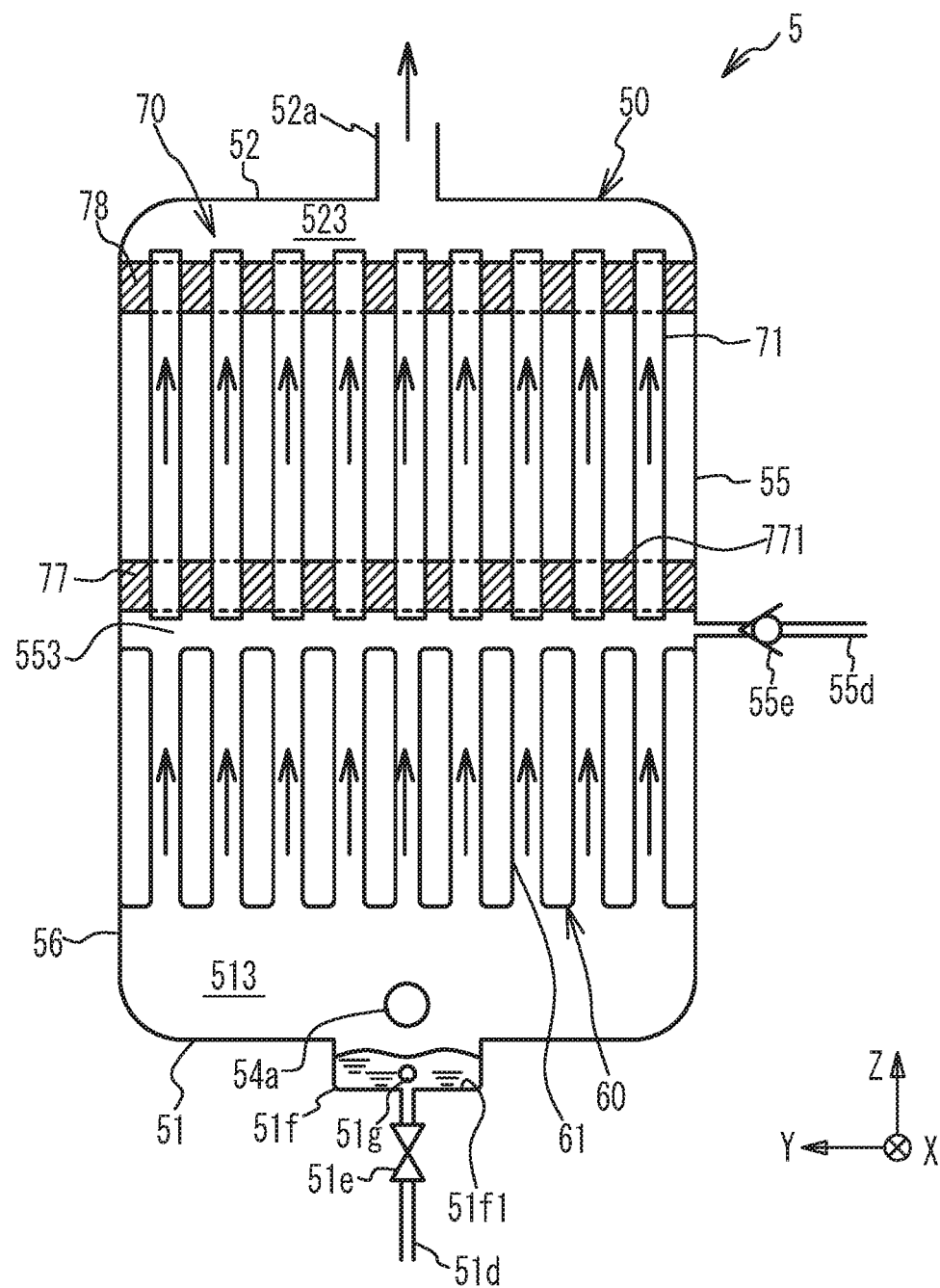
FIG. 4 is a view illustrating the inner configuration of the case.

FIGS. 3 and 4 are views illustrating an inner configuration of the case 50. In the case 50, the humidifying portion 70 is arranged at a vertically upper side from the cooling portion 60, that is, at the +Z direction side therefrom. Firstly, the cooling portion 60 will be described. The cooling portion 60 includes tubes 61 communicating between the coolant inlet portion 53c and the coolant outlet portion 54c. The tube 61 is made of metal with a high thermal conductivity and has a flat tube shape, an axial direction is the X direction, and the width in the Z direction is greater than that in the Y direction. The tubes 61 are arranged side by side substantially in parallel to one another at predetermined intervals in the Y direction. One ends of the tubes 61 are connected to the enlarged portion 53c2, and the other ends are connected to the enlarged portion 54c2. The tubes 61 internally communicate with the enlarged portions 53c2 and 54c2, and the cooling water flows therethrough. The cooling water flows inside the tubes 61 from the front side to the back side of FIG. 4. Further, the left wall 53 are provided with slits, into which the tubes 61 communicating with the enlarged portion 53c2 are respectively inserted, at a portion covered with the enlarged portion 53c2. Likewise, the right wall 54 are provided with slits, into which the tubes 61 communicating with the enlarged portion 54c2 are respectively inserted, at a portion covered with the enlarged portion 54c2.

A lower space 513 is defined between the cooling portion 60 and the lower wall 51 within the case 50. The cathode gas introduced from the gas inlet 54a flows outside the tubes 61 through the lower space 513. Therefore, the flow path through which the cathode gas flows in the cooling portion 60 is defined by the space outside the tubes 61. In such a manner, the tube 61 is an example of a partition wall separating the cooling water flow path from the first cathode gas flow path in the cooling portion 60. The gas inlet 54a communicates with the first cathode gas flow path through the lower space 513. Herein, the cathode gas introduced from the gas inlet 54a is compressed and heated by the compressor 33. Therefore, the cathode gas flowing outside the tubes 61 and the cooling water flowing inside the tubes 61 are heat-exchanged, so that the cathode gas is cooled. Additionally, in order to further efficiently cool the cathode gas, a wavy-shaped fins made of metal may be provided between the tubes 61 so as to contact with the tubes 61.

Figure 5:
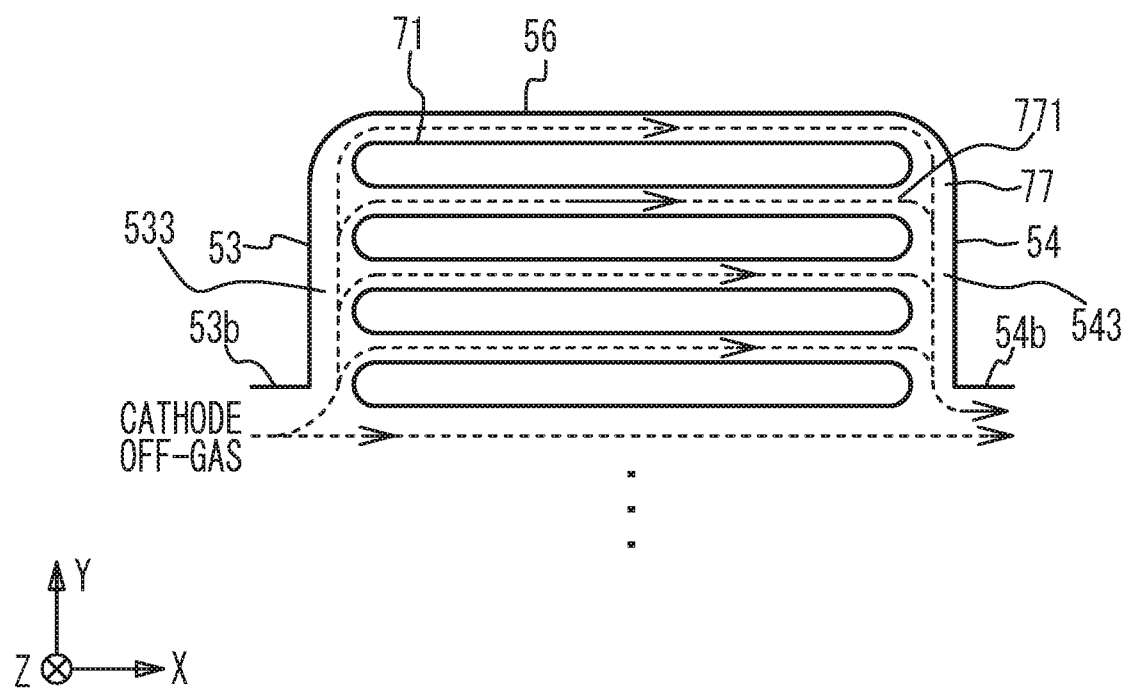
FIG. 5 is a partially cross-sectional view of moisture permeable membranes when viewed in the Z direction.

Next, the humidifying portion 70 will be described. The humidifying portion 70 includes moisture permeable membranes 71. FIG. 5 is a partially cross-sectional view of the moisture permeable membranes 71 when viewed in the Z direction. The moisture permeable membrane 71 extends toward the cooling portion 60 positioned vertically below the moisture permeable membrane 71 the axial direction of which is substantially the same as the Z direction. The moisture permeable membrane 71 has a flat tube shape, a width thereof in the X direction is greater than a width in the Y direction. Like the tubes 61, the moisture permeable membranes 71 are arranged side by side substantially in parallel to one another at predetermined intervals in the Y direction, but the axis of the moisture permeable membrane 71 passes between the tubes 61. The moisture permeable membranes 71 are not in contact with the inner surface of the left wall 53, but face there through a predetermined left space 533, and are not in contact with the inner surface of the right wall 54, but face there through a predetermined right space 543.

Sealing members 77 and 78 are provided on the vertically lower side and the vertically upper side of the moisture permeable membranes 71, respectively. The sealing members 77 and 78 are interposed among the moisture permeable membranes 71. Further, the sealing members 77 and 78 are formed so as to surround the whole of the moisture permeable membranes 71. Specifically, the sealing members 77 and 78 are also interposed between the front wall 55 and the moisture permeable membrane 71 facing the front wall 55, between the rear wall 56 and the moisture permeable membrane 71 facing the rear wall 56, between the left wall 53 and ends of the moisture permeable membranes 71 facing the left wall 53, and between the right wall 54 and ends of the moisture permeable membranes 71 facing the right wall 54. Accordingly, the space outside the moisture permeable membranes 71 discommunicates with the space inside the moisture permeable membranes 71 within the case 50. Further, the sealing member 77 is positioned vertically below the off-gas inlet 53b and the off-gas outlet 54b, and the sealing member 78 is positioned vertically above the off-gas inlet 53b and the off-gas outlet 54b. Therefore, the cathode off-gas introduced from the off-gas inlet 53b is distributed from the left space 533, flows outside the moisture permeable membranes 71, joins in the right space 543, and is discharged from the off-gas outlet 54b. The cathode off-gas flows outside the moisture permeable membranes 71 from the front side to the back side of FIG. 4. Thus, in the humidifying portion 70, the space outside the moisture permeable membranes 71 defines the cathode off-gas flow path through which the cathode off-gas flows. Further, the off-gas inlet 53b communicates with the cathode off-gas flow path through the left space 533, and the off-gas outlet 54b communicates with the cathode off-gas flow path through the right space 543. The sealing member 77 includes a bottom surface 771 facing the sealing member 78. Both the sealing members 77 and 78 are made of rubber. Each of the sealing members 77 and 78 is not always integrally formed with each other, but may be formed by combining rubber members. The bottom surface 771 is an example of an off-gas flow path bottom surface defining the cathode off-gas flow path.

A middle space 553, in which the height in the Z direction is shorter than each of the length in the X direction and the length in the Y direction, is defined between the cooling portion 60 and the humidifying portion 70 within the case 50. Likewise, an upper space 523, in which the height in the Z direction is shorter than each of the length in the X direction and the length in the Y direction, is defined between the humidifying portion 70 and the upper wall 52 within the case 50. Opening ends of the vertically lower sides of the moisture permeable membranes 71 face the middle space 553, and opening ends of the vertically upper sides of the moisture permeable membranes 71 face the upper space 523. Thus, the space inside the moisture permeable membranes 71 communicate with the middle space 553 and the upper space 523. Thus, the cathode gas flowing outside the tubes 61 flows inside the moisture permeable membrane 71 through the middle space 553, and the cathode gas discharged from inside the moisture permeable membranes 71 is discharged through the upper space 523 from the gas outlet 52a. Therefore, in the humidifying portion 70, the insides of the moisture permeable membranes 71 define the cathode gas flow path through which the cathode gas flows. The moisture permeable membrane 71 is an example of a first moisture permeable member separating the cathode off-gas flow path from the second cathode gas flow path. Further, the moisture permeable membrane 71 has a tubular shape, and its inside defines the second cathode gas flow path, and its axial direction intersects the horizontal direction and extends to the cooling portion 60. Furthermore, the first cathode gas flow path and the second cathode gas flow path described above communicate with each other through the middle space 553. Since the sealing members 77 and 78 cause the space outside the moisture permeable membranes 71 not to communicate with the space inside the moisture permeable membranes 71 within the case 50 as described above, the cathode gas is not mixed with the cathode off-gas within the case 50.

Herein, in the moisture permeable membrane 71, water molecules move within the membrane according to the difference in water vapor partial pressure of the gases flowing inside and outside the moisture permeable membrane 71. In the present embodiment, the cathode gas compressed by the compressor 33 and cooled in the cooling portion 60 flows inside the moisture permeable membranes 71, and the cathode off-gas flows outside the moisture permeable membranes 71. Herein, the water vapor partial pressure of the cathode off-gas is higher than that of the cathode gas, due to the water generated by the power generation reaction of the fuel cell 20. Therefore, moisture contained in the cathode off-gas moves to the cathode gas through the moisture permeable membrane 71, which humidifies the cathode gas. The moisture permeable membrane 71 is made of, for example, polyether sulfone, polyimide, polyolefin, or the like.

Next, the water storage portion 51f will be described. The water storage portion 51f is provided in the lower wall 51 and has a recessed shape recessed downward in the vertical direction. The water storage portion 51f has a bottom surface 51f1 positioned below the inner surface of the lower wall 51 in the vertical direction. The condensed water generated in the humidifying portion 70 is stored in the water storage portion 51f. For example, the cathode gas compressed and heated by the compressor 33 is cooled by flowing outside the tubes 61, and the cooled cathode gas is humidified by the moisture permeable membranes 71 to such an extent that the water vapor amount exceeds the saturated water vapor amount, and then condensed water is often generated on the inner surfaces of the moisture permeable membranes 71. Herein, the moisture permeable membrane 71 has a flat tubular shape in which its axial direction is substantially the same as the vertical direction of the Z direction, in other words, and the moisture permeable membrane 71 intersects the horizontal direction and extends toward the cooling portion 60. Thus, for example, the condensed water is generated on the inner surfaces of the moisture permeable membranes 71 after the power generation of the fuel cell 20 stops, and the condensed water drops in the vertical direction along the inner surfaces of the moisture permeable membranes 71 by gravity, and then the condensed water passes through between the tubes 61 and is stored in the water storage portion 51f. In this manner, drainage of the moisture permeable membranes 71 is improved. For example, if the axial direction of the moisture permeable membrane 71 is arranged so as to be the same as the horizontal direction, the system 1 stops with the condensed water adhering to the moisture permeable membranes 71, and the condensed water might freeze depending on the outside air temperature. When the condensed water freezes, its volume increases, so stresses are applied to the moisture permeable membranes 71. Repetition of such freezing of the condensed water on the moisture permeable membranes 71 might damage the moisture permeable membranes 71. Since the drainage of the moisture permeable membranes 71 is improved in the present embodiment, such a problem is suppressed from occurring.

The condensed water adhering to the inner surfaces of the tubes 61 and the lower wall 51 is collected in the water storage portion 51f, due to vibrations applied to the cooling and humidifying device 5 and due to the flow of the cathode gas within the case 50. In this way, since the condensed water is collected in one place without being dispersed, for example, the cathode gas is suppressed from being excessively humidified by condensed water dispersed on the inner surface of the lower wall 51 blown away by the cathode gas. Further, the bottom surface 51f1 of the water storage portion 51f is positioned vertically below the inner surface of the lower wall 51 of the portion other than the water storage portion 51f. Therefore, the cathode gas flows along the inner surface of the lower wall 51 without being influenced by the water stored in the water storage portion 51f. This suppress the excessive humidification of the cathode gas due to the water stored in the water storage portion 51f blown away by the cathode gas. The bottom surface 51f1 has a planar shape perpendicular to the Z direction, but not limited thereto, and it may be, for example, a conical surface inclined vertically downward to the center.

The tube 61 is composed of flat outer planes. Outer planes each having the largest area among the outer planes are surfaces of the tubes 61 facing each other, and intersect the horizontal direction, that is, arranged along the vertical direction. For example, if such outer planes each having the largest area are parallel to the horizontal direction, the condensed water dropping from the moisture permeable membranes 71 might stay on the outer plane and might be blown away by the cathode gas. In the present embodiment, since such outer planes are along the vertical direction, the condensed water adhering to the outer planes flows easily toward the lower wall 51. In this way, the drainage from the tubes 61 are secured.

The gas inlet 54a is positioned vertically above the inner surface of the lower wall 51 including the bottom surface 51f1. Therefore, the cathode gas is prevented from colliding with the water stored in the water storage portion 51f or the water adhering to the inner surface of the lower wall 51 other than the water storage portion 51f. Further, since the gas inlet 54a is positioned vertically below the cooling portion 60, the cathode gas introduced from the gas inlet 54a into the case 50 can be cooled by the cooling portion 60. In addition, although the gas inlet 54a is provided in the right wall 54, the gas inlet 54a may be provided in any one of the left wall 53, the front wall 55, and the rear wall 56 so long as the gas inlet 54a is positioned vertically above at least a part of the inner surface of the lower wall 51 and positioned vertically below the cooling portion 60.

The water storage portion 51f is provided with a sensor 51g for detecting a water storage amount. Specifically, the sensor 51g detects the water storage amount by detecting the liquid level height of the water stored in the water storage portion 51f. The sensor 51g is electrically connected to the control device 10. The first drain pipe 51d is connected to the bottom surface 51f1. The first drain valve 51e provided in the first drain pipe 51d is controlled to open and close by the control device 10 in accordance with the detection result of the sensor 51g. The opening of the first drain valve 51e causes the water stored in the water storage portion 51f to be discharged outside through the first drain pipe 51d. Drainage control from the water storage portion 51f will be described later.

The second drain pipe 54d communicates with the right space 543, and the right space 543 communicates with the space outside the moisture permeable membranes 71 as described above. That is, the second drain pipe 54d communicates with the cathode off-gas flow path through the right space 543 in the humidifying portion 70. Although the condensed water generated outside the moisture permeable membranes 71 is stored in the cathode off-gas flow path and the right space 543, the opening of the second drain valve 54e causes such condensed water to be discharged outside through the second drain pipe 54d. For example, the second drain valve 54e may be controlled to open for a predetermined period, when the power generation period of the fuel cell 20 is equal to or greater than a threshold value. In addition, the second drain pipe 54d is provided in the right wall 54 positioned on the most downstream side of the cathode off-gas, among the left wall 53, the right wall 54, the front wall 55, and the rear wall 56. For this reason, the cathode off-gas promotes the movement of the condensed water to the right wall 54. Accordingly, the condensed water can be efficiently discharged outside from the second drain pipe 54d. Further, the second drain pipe 54d is provided at the same height as the bottom surface 771 of the sealing member 77. Specifically, a portion on the vertically lower side of the inner surface of the second drain pipe 54d and the bottom surface 771 are provided so as to be continuous with each other in the X direction. Thus, the condensed water generated outside the moisture permeable membranes 71 can be guided from the bottom surface 771 to the second drain pipe 54d. The height of the portion on the vertically lower side of the inner surface of the second drain pipe 54d may be lower than that of the bottom surface 771.

The pressure regulating pipe 55d communicates with the middle space 553. The check valve 55e allows the gas to move from the inside to the outside of the case 50, but restricts the reverse flow. When the pressure of the cathode gas in the case 50 is equal to or greater than a predetermined value, the check valve 55e opens. This suppresses the pressure in the case 50 from excessively increasing. In addition, depending on the compressibility of the cathode gas by the compressor 33 and the cooling performance of the cathode gas by the cooling portion 60, the increase in the pressure of the cathode gas in the case 50 can be suppressed. In such a case, the pressure regulating pipe 55d or the check valve 55e may not be provided.

Figure 6:
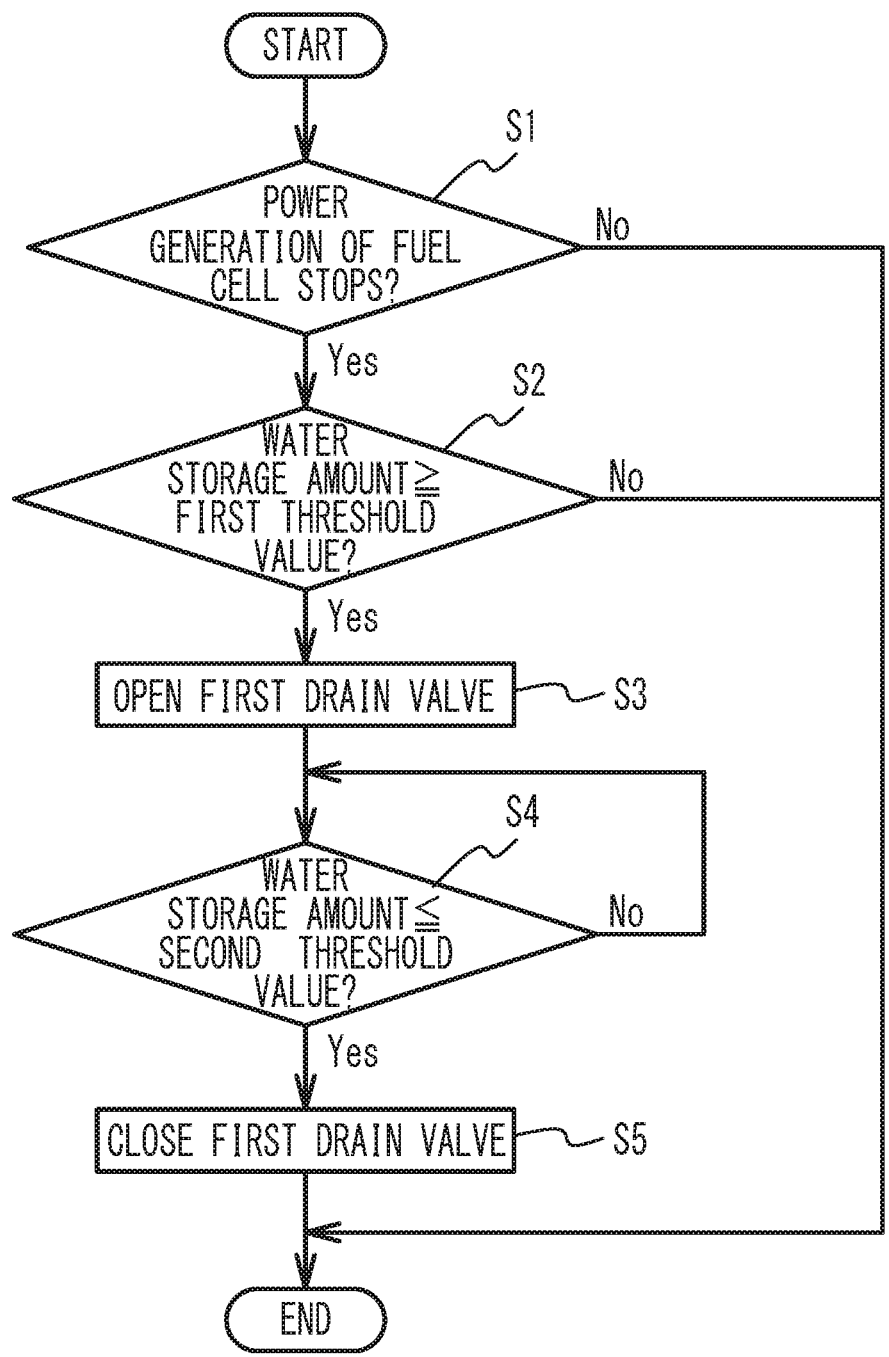
FIG. 6 is a flowchart illustrating an example of drainage control.

Next, the drainage control from the water storage portion 51f will be described. FIG. 6 is a flowchart illustrating an example of the drainage control. Firstly, it is determined whether or not the power generation of the fuel cell 20 stops (step S1). When a negative determination is made, the control ends. When an affirmative determination is made, it is determined whether or not the water storage amount in the water storage portion 51f is equal to or greater than the first threshold value on the basis of the detection result from the sensor 51g (step S 2). When a negative determination is made, the control ends. When an affirmative determination is made, the first drain valve 51e opens (Step S3), whereby the stored water in the water storage portion 51f is discharged outside through the first drain pipe 51d. Next, it is determined whether or not the water storage amount in the water storage portion 51f is equal to or smaller than the second threshold value (step S4). The second threshold value may be, for example, zero, but not limited thereto, and it may be a minute value approximating zero. When a negative determination is made, the processing of step S4 is executed again. When an affirmative determination is made, the first drain valve 51e closes (step S5). In this way, the drainage control is executed. As described above, the first drain valve 51e opens, when the power generation of the fuel cell 20 stops. This suppresses a decrease in the amount of the cathode gas to be supplied to the fuel cell 20 due to the fact that the cathode gas introduced into the case 50 during the power generation of the fuel cell 20 is discharged together with the water stored in the water storage portion 51f to the outside from the first drain pipe 51d.

Herein, the control device 10 often executes scavenging control to enhance the drainage from the fuel cell 20 in stopping the power generation of the fuel cell 20 by use of the cathode gas compressed by the compressor 33. As for the scavenging control, water is desirably discharged outside not only from the fuel cell 20 but also from the supply path 31, the cooling and humidifying device 5, and the discharge path 32. Thus, the power consumption of the compressor 33 is set to be large. With the drainage control to open the first drain valve 51e described above in the present embodiment, most of the water in the cooling and humidifying device 5 can be discharged outside. Therefore, even in a case of a small power consumption of the compressor 33 in the scavenging control, water in the cooling and humidifying device 5 as well as in the fuel cell 20, the supply path 31, and the discharge path 32 can be discharged outside. As for the execution of the scavenging control of the fuel cell 20, the drainage control may be executed after the power generation of the fuel cell 20 stops, and then the scavenging control may be executed. This is because when the scavenging control of the fuel cell 20 is executed before the condensed water in the cooling and humidifying device 5 is discharged, the condensed water in the cooling and humidifying device 5 is introduced into the fuel cell 20, which might increase the required power consumption for the scavenging control of the fuel cell 20.

Additionally, in opening the first drain valve 51e, the compressor 33 may be temporally operated to introduce the cathode gas into the case 50 so as to increase the pressure in the case 50. The pressure loss of the cathode gas flowing between the tubes 61 and between the moisture permeable membranes 71 is relatively large. For this reason, immediately after the cathode gas is introduced into the case 50, before the cathode gas flows among the tubes 61 and among the moisture permeable membranes 71 and is discharged from the case 50, the pressure in the lower space 513 increases and the pressure of the cathode gas exerts on the liquid surface of the stored water in the water storage portion 51f. By opening the first drain valve 51e when the pressure of the cathode gas exerts on the liquid surface of the stored water, the drainage of the stored water from the first drain pipe 51d can be enhanced. Further, the drainage control may be executed together with the scavenging control described above.

Instead of the processing of steps S2 to S5, the drainage may be executed by opening the first drain valve 51e for a predetermined period, for example, when an accumulated period of the power generation of the fuel cell 20 from the time when the drainage is previously executed is greater than a threshold value. Alternatively, when the flow rate of the cathode gas supplied to the fuel cell 20 accumulated from the previous drainage execution is greater than a threshold value, the drainage may be executed by opening the first drain valve 51e for a predetermined period. In this case, the sensor 51g may not be provided.

In the present embodiment, the axial direction of the moisture permeable membrane 71 is substantially the same as the vertical direction, but is not limited thereto. For example, even in a case where the axial direction of the moisture permeable membrane 71 is inclined with respect to the vertical direction, the axial direction may be any direction that intersects the horizontal direction and extends to the cooling portion 60. This is because, even in this case, since the axial direction of the moisture permeable membrane 71 intersects the horizontal direction, the condensed water generated inside the moisture permeable membrane 71 can move downwardly through the inner surface of the moisture permeable membrane 71 by gravity, and since the axial direction of the moisture permeable membrane 71 extends to the cooling portion 60, the condensed water can drop from the moisture permeable membrane 71 and can be discharged to the cooling portion 60. Incidentally, the fact that the axial direction of the moisture permeable membrane 71 extends to the cooling portion 60 is the same meaning as the fact that the axial direction of the moisture permeable membrane 71 intersects the cooling portion 60.

In the present embodiment, the sealing members 77 and 78 restrict mixing of the cathode gas and the cathode off-gas, but means for restricting the mixing of both gases is not limited to such sealing members 77 and 78. For example, in a state where the moisture permeable membranes 71 are arranged side by side as described above, the side surfaces of the vertically upper ends may be bonded to each other, and the side surfaces of the vertically lower ends may be bonded to each other. This permits the cathode off-gas to flow between the vertically upper ends and the vertically lowers end of the moisture permeable membranes 71 not bonded to each other, while preventing the cathode gas from flowing between the moisture permeable membranes 71 from the vertically downward side.

In the present embodiment, the water storage portion 51f is provided, but the present invention is not limited to such a configuration. For example, the lower wall may have a flat shape without providing the water storage portion 51f, and the first drain pipe 51d and the first drain valve 51e may be provided in the flat lower wall. In this case, the stored water on the lower wall can be discharged outside the case. Also in this case, in order to detect the amount of water stored on the lower wall, the sensor 51g may be provided in the lower wall, or the sensor 51g may be provided in any one of the left wall, the right wall, the front wall, and the rear wall at a portion close to the lower wall.

The tube 61 has a flat tubular shape, but it is not limited to such a shape, and may be a cylindrical shape or a rectangular tubular shape.

Figure 7:
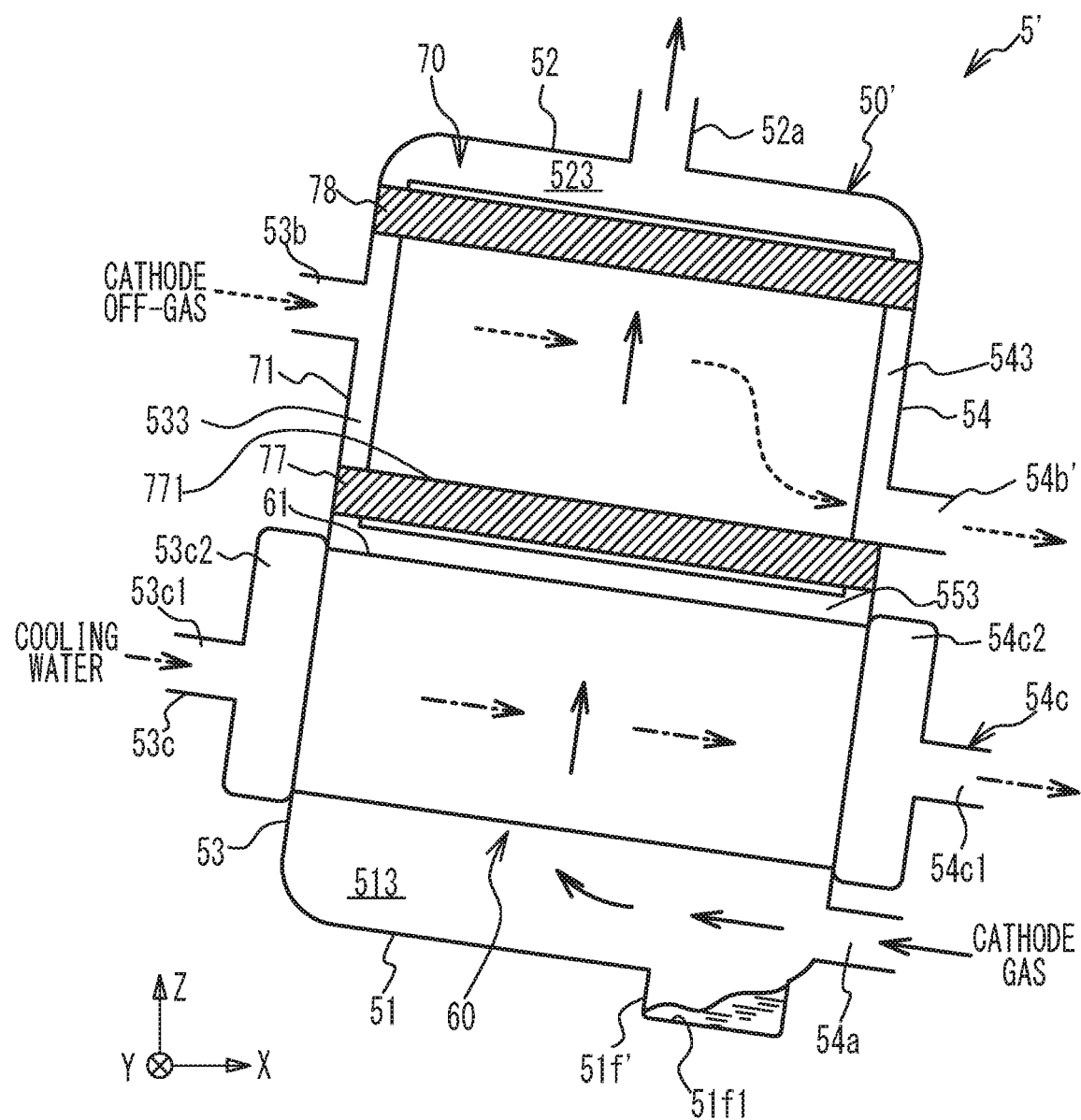
FIG. 7 is an explanatory view of a cooling and humidifying device according to a variation.

Next, cooling and humidifying devices according to variations will be described. In the variations, the same reference numerals are given to the same configurations as those of the above-described embodiment, and a duplicated description is omitted. FIG. 7 is an explanatory view of a cooling and humidifying device 5' according to a variation. FIG. 7 is a cross-sectional view similar to FIG. 3. FIG. 3 illustrates the space between the tubes 61 and the inside of the moisture permeable membrane 71, whereas FIG. 7 illustrates the inside of the tube 61 and the space between the moisture permeable membranes 71. Also in this variation, since the axial direction of the moisture permeable membrane 71 intersects the horizontal direction and the moisture permeable membrane 71 extends toward the cooling portion 60, the drainage of the moisture permeable membrane 71 is ensured.

The cooling and humidifying device 5' according to this variation is arranged in a slightly inclined posture with respect to the Z direction, as compared with the cooling and humidifying device 5 described above. Specifically, a case 50' is arranged in an inclined posture such that the left wall 53 faces upward and the right wall 54 faces downward. Therefore, the lower wall 51 is arranged in a posture inclined downward from the left wall 53 to the right wall 54. Herein, a water storage portion 51f is formed closer to the right wall 54 than the left wall 53. Thus, the condensed water adhering to the lower wall 51 easily flows toward the water storage portion 51f by gravity, and can be efficiently collected by the water storage portion 51f. Further, the gas inlet 54a is positioned vertically above the bottom surface 51f1 that is at least a part of the inner surface of the lower wall 51, thereby suppressing the excessive humidification of the cathode gas due to the water stored in the water storage portion 51f blown away by the cathode gas.

The sealing member 77 is also arranged in a posture inclined downward from the left wall 53 to the right wall 54. Thus, for example, moisture contained in the cathode off-gas flowing between the sealing members 77 and 78 and outside the moisture permeable membranes 71 is condensed, and the condensed water adhering to the outer surface of the moisture permeable membrane 71 drops to the upper surface of the sealing member 77 by gravity, and the condensed water moves on the upper surface of the sealing member 77 from the left wall 53 to the right wall 54. Also, since the cathode off-gas flows on the upper surface of the sealing member 77 from the off-gas inlet 53b to an off-gas outlet 54b', the flow of the condensed water to the off-gas outlet 54b' is enhanced. Herein, the off-gas outlet 54b' is provided such that a portion of the vertically lower side of the inner surface of the off-gas outlet 54b' is continuous with the bottom surface 771. This facilitates guiding the condensed water, generated outside the moisture permeable membranes 71, from the bottom surface 771 to the off-gas outlet 54b'. A height of the portion of the vertically lower side of the inner surface of the off-gas outlet 54b' may be lower than that of the bottom surface 771. In the above manner, the drainage of the condensed water, generated outside the moisture permeable membranes 71, from the off-gas outlet 54b' is enhanced. Even with such a configuration, the drainage of the moisture permeable membranes 71 is ensured, which suppresses the damage to the moisture permeable membranes 71 caused by the freezing of the condensed water adhering to the moisture permeable membranes 71.

In this variation, the drainage of the condensed water generated outside the moisture permeable membranes 71 is improved as described above, so that the second drain pipe 54d and the second drain valve 54e are not provided unlike the present embodiment described above. Thus, this variation suppresses an increase in size and an increase in complexity of the structure. Further, in this variation, the first drain pipe 51d and the first drain valve 51e are not provided in the water storage portion 51f, but may be provided. Furthermore, in this variation, the water storage portion 51f may not be provided.

Figure 8:
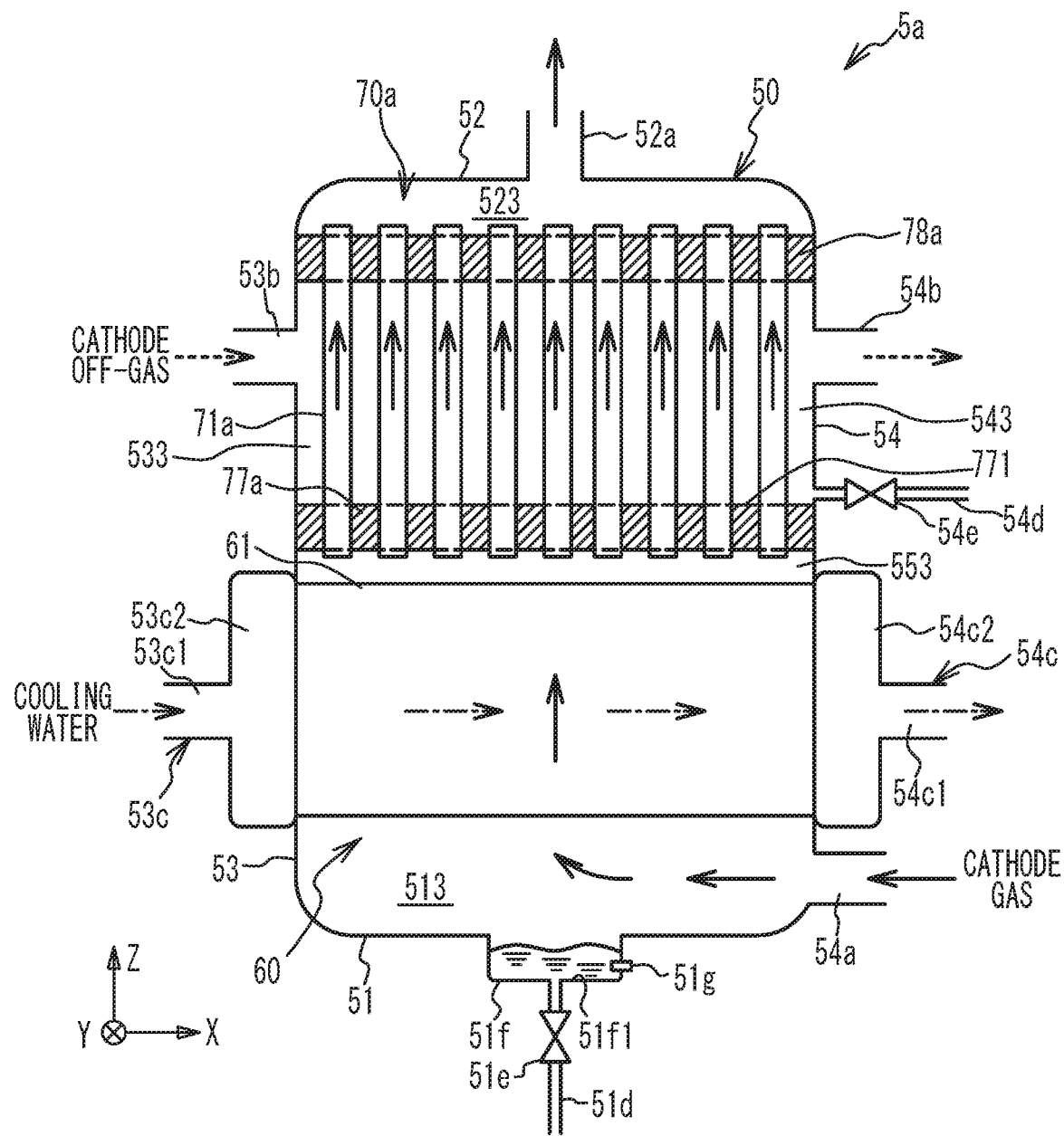
FIG. 8 is an explanatory view of a cooling and humidifying device according to a variation.
Figure 9:
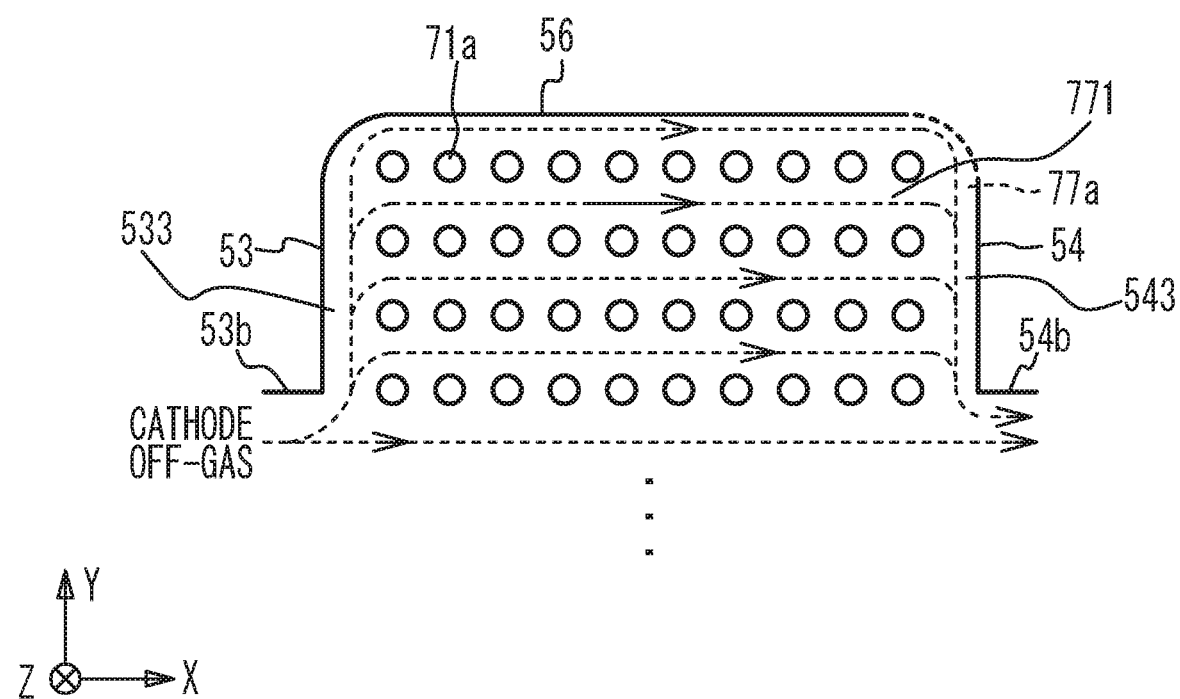
FIG. 9 is a partially enlarged view of hollow fiber membranes of the cooling and humidifying device when viewed in the Z direction.

FIG. 8 is an explanatory view of a cooling and humidifying device 5a according to a variation, and is a cross-sectional view corresponding to FIG. 3. FIG. 9 is a partially enlarged view of hollow fiber membranes 71a of the cooling and humidifying device 5a when viewed in the Z direction, and corresponds to FIG. 5. A cross-sectional view of the cooling and humidifying device 5a perpendicular to the X direction is similar to FIG. 4 and is therefore not illustrated. A humidifying portion 70a of the cooling and humidifying device 5a uses the hollow fiber membranes 71a each having a substantially cylindrical shape in which the axial direction extends in the Z direction, instead of the moisture permeable membranes 71 each having a flat tubular shape. The hollow fiber membranes 71a are arranged substantially in parallel to one another at predetermined intervals in the X direction and in the Y direction. The axial direction of the hollow fiber membrane 71a is substantially the same as the Z direction, and intersects the X direction and the Y direction which are the horizontal direction. The hollow fiber membrane 71a is also made of the same material as the moisture permeable membrane 71 described above.

Sealing members 77a and 78a are provided on the vertically lower side and the vertically upper side of the hollow fiber membranes 71a, respectively. The sealing members 77a and 78a are interposed among the hollow fiber membranes 71a. Further each of the sealing members 77a and 78a is formed so as to surround the whole of the hollow fiber membranes 71a. Specifically, the sealing members 77a and 78a are also interposed among the front wall 55 and the hollow fiber membranes 71a facing the front wall 55, among the rear wall 56 and the hollow fiber membranes 71a facing the rear wall 56, among the left wall 53 and the hollow fiber membranes 71a facing the left wall 53, and among the right wall 54 and the hollow fiber membranes 71a facing the right wall 54. Therefore, the space outside the hollow fiber membranes 71a within the case 50 discommunicates with the space inside the hollow fiber membranes 71a. Accordingly, the cathode off-gas flows outside the hollow fiber membranes 71a, and the cathode gas flows inside the hollow fiber membranes 71a. Therefore, the hollow fiber membrane 71a is an example of a first moisture permeable member separating the second cathode gas flow path from the cathode off-gas flow path. In addition, the hollow fiber membrane 71a has a tubular shape, and its inside defines the second cathode gas flow path, and its axial direction intersects the horizontal direction and extends to the cooling portion 60.

Since the cathode gas flows inside the hollow fiber membranes 71a and the cathode off-gas flows outside the hollow fiber membranes 71a, the cathode gas is humidified by moisture contained in the cathode off-gas. Further, as described above, the hollow fiber membrane 71a also has a substantially cylindrical shape, and its axial direction intersects the horizontal direction and extends toward the cooling portion 60. Therefore, the drainage of the hollow fiber membranes 71a is secured.

Also in this variation, the axial direction of the hollow fiber membrane 71a is substantially the same as the vertical direction, but is not limited thereto. Even in a case where the axial direction of the hollow fiber membrane 71a is inclined with respect to the vertical direction, the axial direction may be any direction that intersects the horizontal direction and extends to the cooling portion 60.

Figure 10:
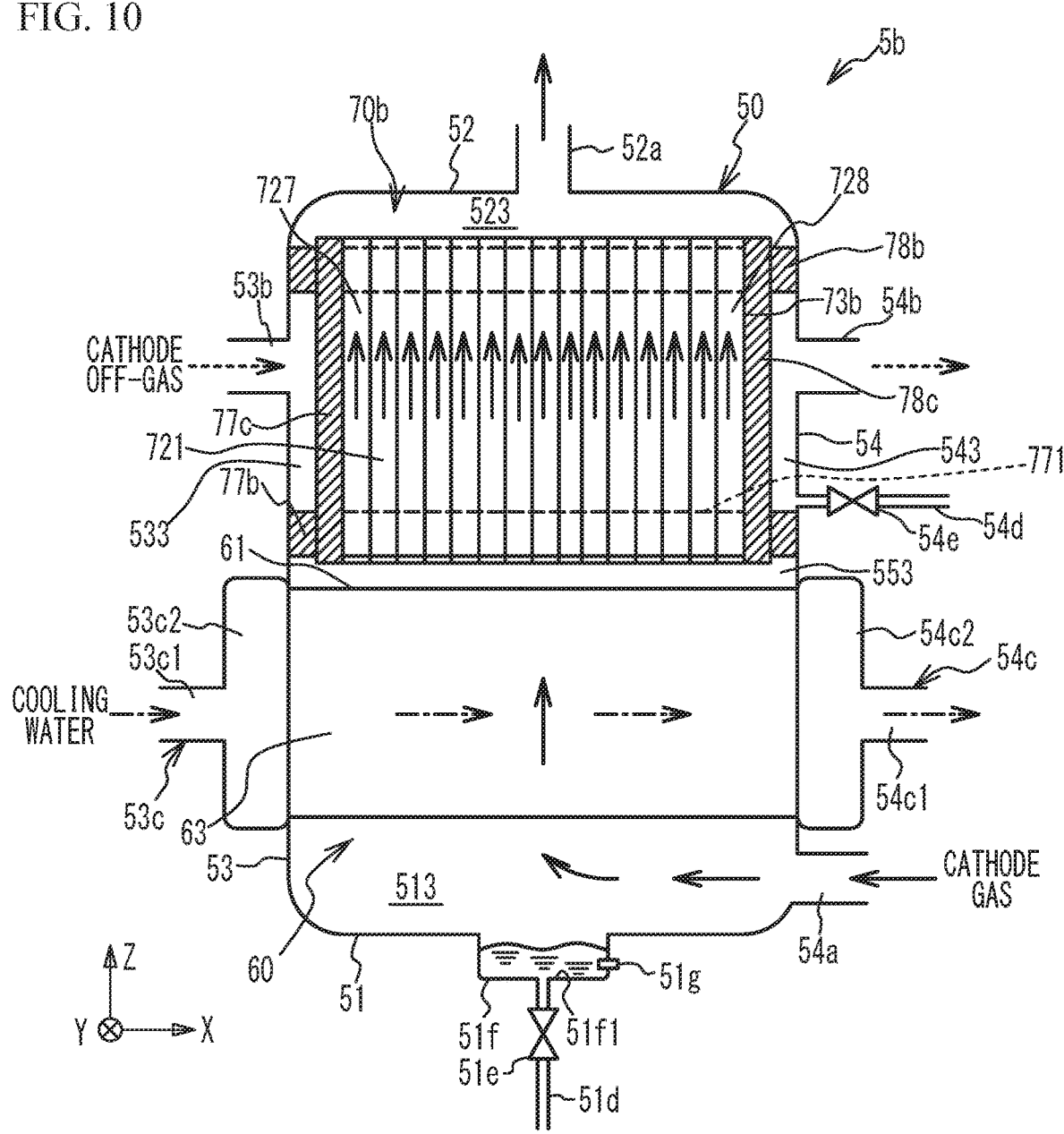
FIG. 10 is an explanatory view of a cooling and humidifying device according to a variation.
Figure 11:
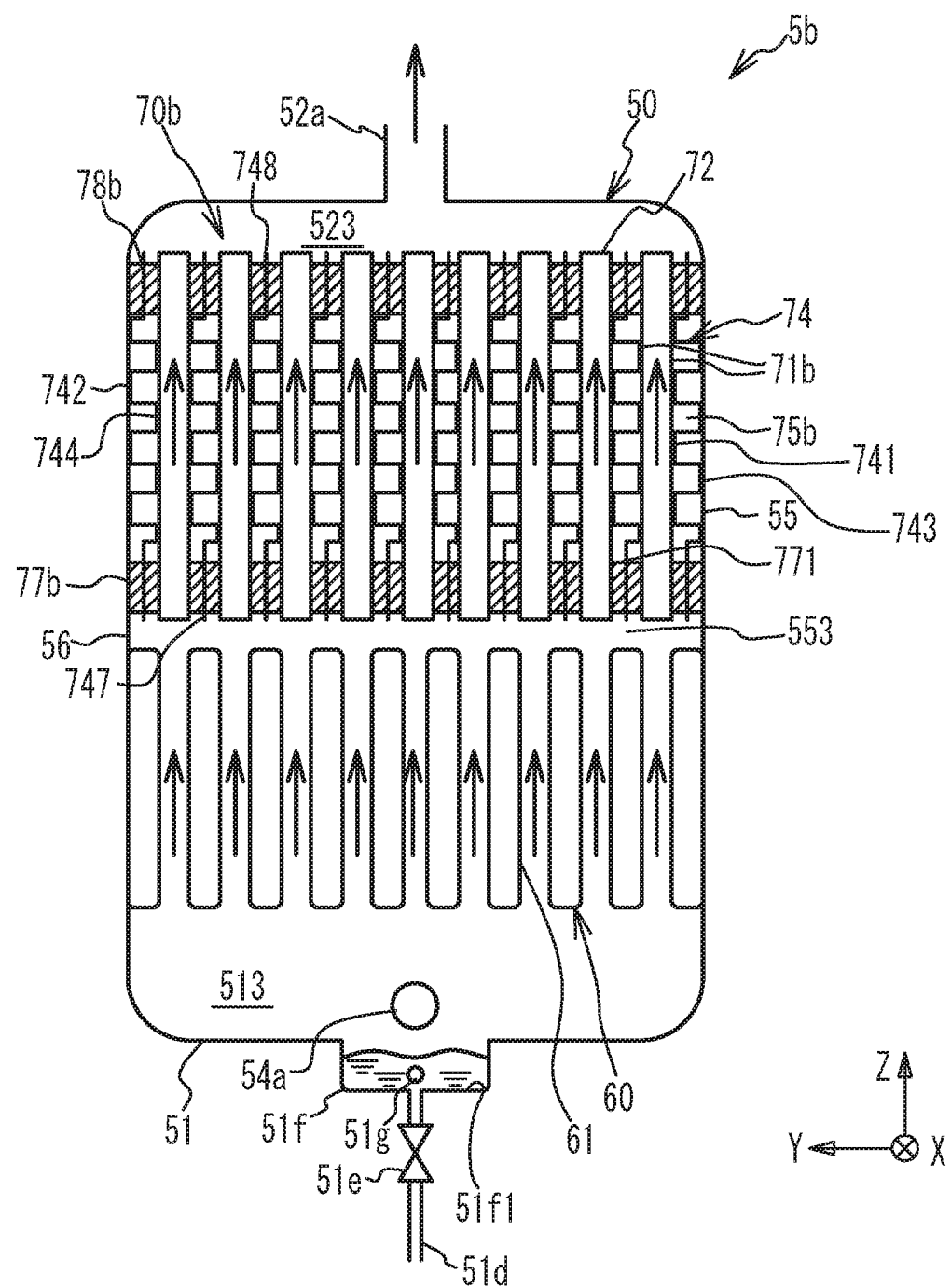
FIG. 11 is an explanatory view of the cooling and humidifying device according to the variation.
Figure 12:
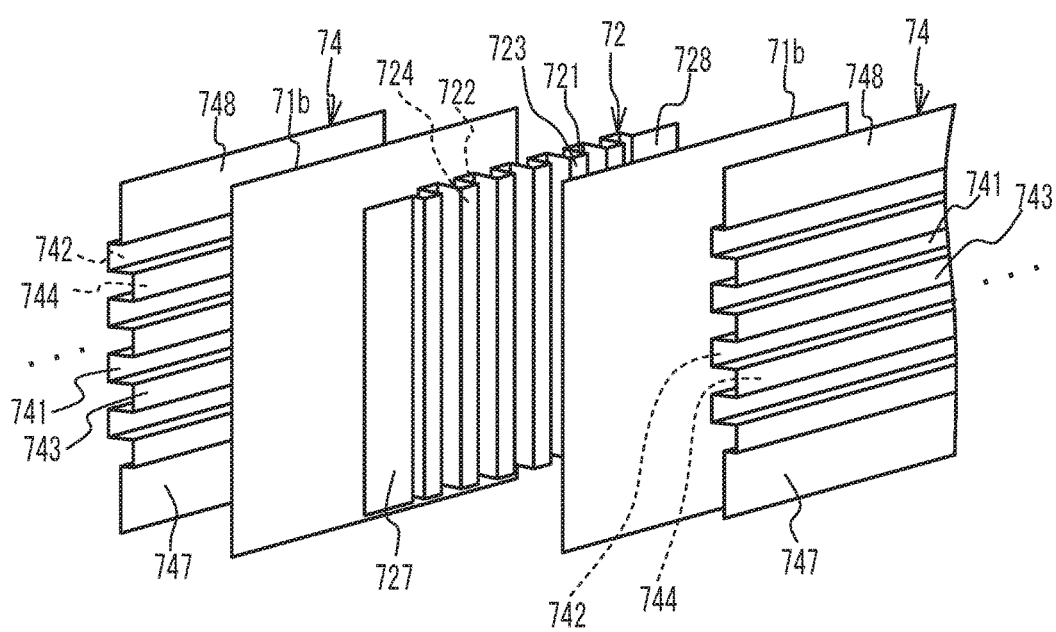
FIG. 12 is an exploded perspective view of a part of a humidifying portion of the cooling and humidifying device.

Next, a cooling and humidifying device according to another variation will be described. FIGS. 10 and 11 are explanatory views of a cooling and humidifying device 5b according to a variation, and respectively correspond to FIGS. 3 and 4. FIG. 12 is an exploded perspective view of a part of a humidifying portion 70b of the cooling and humidifying device 5b. The humidifying portion 70b of the cooling and humidifying device 5b uses flat moisture permeable membranes 71b and separators 72 and 74, instead of the flat-tubular shaped moisture permeable membranes 71 described above. The separators 72 and 74 may be made of metal or synthetic resin. The separators 72 and 74 are alternately arranged side by side in the Y direction. The moisture permeable membrane 71b is arranged between the separators 72 and 74. The moisture permeable membranes 71b and the separators 72 and 74 are arranged such that thickness directions thereof are the Y direction. Although the moisture permeable membrane 71b is also made of the same material as the above moisture permeable membrane 71, the moisture permeable membrane 71b may be an electrolyte membrane in use of, for example, the fuel cell 20. FIG. 12 illustrates only a part of the moisture permeable membranes 71b and the separators 72 and 74.

As illustrated in FIG. 12, one surface of the separator 72 is provided with a concave surface 721 and a convex surface 723 that are alternately arranged in the X direction, and the other surface of the separator 72 is provided with a convex surface 722 and a concave surface 724 that are alternately arranged in the X direction. The opposite surfaces of the concave surface 721 and the convex surface 723 respectively correspond to the convex surface 722 and the concave surface 724. The concave surfaces 721 and 724 and the convex surfaces 722 and 723 extend in the Z direction. Therefore, the separator 72 has a wavy shape when viewed in the Z direction. The concave surface 721 is not in contact with the moisture permeable membrane 71b arranged on one side of the separator 72, but the convex surface 723 is in contact therewith. The convex surface 722 is in contact with the moisture permeable membrane 71b arranged on the other side of the separator 72, but the concave surface 724 is not in contact therewith. A left end 727 having a flat plate shape is formed in the left wall 53 side of the separator 72. A right end 728 having a flat plate shape is also formed in the right wall 54 side of the separator 72. The left end 727 and the right end 728 will be described later. In FIG. 12, the concave surface 721 and the convex surface 723 are on the front side, and the convex surface 722 and the concave surface 724 are on the back side.

The separator 74 has a shape similar to that of the separator 72, but the separator 74 has a wavy shape when viewed in the X direction. Specifically, one surface of the separator 74 is provided with a concave surface 741 and a convex surface 743 that are alternately arranged in the Z direction, and the other surface is provided with a convex surface 742 and a concave surface 744 that are alternately arranged in the Z direction. The surfaces opposite to the concave surface 741 and the convex surface 743 correspond to the convex surface 742 and the concave surface 744, respectively. The concave surfaces 741 and 744 and the convex surfaces 742 and 743 extend in the Z direction. The concave surface 741 is not in contact with the moisture permeable membrane 71b arranged on one side of the separator 74, but the convex surface 743 is in contact therewith. The convex surface 742 is in contact with the moisture permeable membrane 71b arranged on the other side of the separator 74, but the concave surface 744 is not in contact therewith. In FIG. 12, the concave surface 741 and the convex surface 743 are on the front side, and the convex surface 742 and the concave surface 744 are on the back side.

A lower end 747 having a flat plate shape is formed on the vertically lower side of the separator 74, and an upper end 748 having a flat plate shape is also formed on the vertically upper side of the separator 74. The lower end 747 and the upper end 748 are formed so as not to contact any of the two moisture permeable membranes 71b respectively positioned on both sides of the separator 74. As illustrated in FIG. 11, a sealing member 77b is interposed between the lower end 747 and the moisture permeable membrane 71b arranged on one side of the lower end 747, and between the lower end 747 and the moisture permeable membrane 71b arranged on the other side of the lower end 747. Likewise, a sealing member 78b is interposed between the upper end 748 and the moisture permeable membrane 71b arranged on one side of the upper end 748, and between the upper end 748 and the moisture permeable membrane 71b arranged on the other side of the upper end 748. The sealing member 77b is bonded to the lower end 747 and the moisture permeable membrane 71b, and the sealing member 78b is bonded to the upper end 748 and the moisture permeable membrane 71b. Accordingly, the cathode gas is prevented from entering between the moisture permeable membrane 71b and the separator 74 from the left space 533.

As illustrated in FIG. 10, the separators 74 are spaced away from each of the left wall 53 and the right wall 54 by a predetermined distance, which defines the left space 533 and the right space 543. The sealing members 77b and 78b respectively surround the whole of the separators 74, the moisture permeable membranes 71b, and the separators 72, on the vertically lower side and the vertically upper side of the humidifying portion 70b, respectively. Specifically, the sealing members 77b and 78b are interposed between the front wall 55 and the separator 74 facing the front wall 55, between the rear wall 56 and the separator 74 facing the rear wall 56, among the left wall 53, the separators 74 facing the left wall 53, the moisture permeable membranes 71b, and ends of the separators 72, and among the right wall 54, the separators 74 facing the right wall 54, the moisture permeable membranes 71b, and ends of the separators 72.

The left end 727 and the right end 728 of the separator 72 are formed so as not to contact any of the two moisture permeable membranes 71b respectively positioned on both sides of the separator 72. As illustrated in FIG. 10, sealing members 77c are interposed between the left end 727 and the moisture permeable membrane 71b arranged on one side of the left end 727, and between the left end 727 and the moisture permeable membrane 71b arranged on the other side of the left end 727. Likewise, sealing members 78c are interposed between the right end 728 and the moisture permeable membrane 71b arranged on one side of the right end 728, and between the right end 728 and the moisture permeable membrane 71b arranged on the other side of the right end 728. The sealing members 77c and 78c are provided each between the separator 72 and the moisture permeable membrane 71b. The sealing members 77c and 78c each has a rectangular column shape extending in the Z direction. The sealing member 77c is bonded to the left end 727 and the moisture permeable membrane 71b. The sealing member 78c is bonded to the right end 728 and the moisture permeable membrane 71b. Accordingly, the cathode off-gas is prevented from entering between the moisture permeable membrane 71b and the separator 72 from the left space 533. In addition, the left ends 727 and the sealing members 77c are spaced away from the left wall 53 by a predetermined distance. Likewise, the right ends 728 and the sealing members 78c are spaced away from the right wall 54 by a predetermined distance.

The sealing members 77c and 78c in addition to the separators 74, the moisture permeable membranes 71b, and the separators 72 are surrounded by the sealing members 77b and 78b described above. Herein, both ends of the concave surfaces 721 and 724 of the separator 72 extending in the Z direction respectively face the middle space 553 and the upper space 523. Likewise, both ends of the concave surfaces 721 and 724 of the separator 74 extending in the X direction respectively face the left space 533 and the right space 543. Thus, the middle space 553, the space between the separator 72 and the moisture permeable membrane 71b, and the upper space 523, through which the cathode gas flows in this order, do not communicate with the left space 533, the space between the separator 74 and the moisture permeable membrane 71b, and the right space 543, through which the cathode off-gas flows in this order.

Thus, the cathode off-gas introduced from the off-gas inlet 53b is distributed in the left space 533 and flows along the concave surfaces 741 and the convex surfaces 742 of the separator 74, and the distributed cathode off-gases discharged from the concave surfaces 741 and the convex surfaces 742 join one another in the right space 543, and the joined cathode off-gas is discharged from the off-gas outlet 54b. Accordingly, the cathode off-gas flows between the moisture permeable membrane 71b arranged on one side of the separator 74 and the concave surface 741, and between the moisture permeable membrane 71b arranged on the other side of the separator 74 and the convex surface 742. Therefore, the moisture permeable membrane 71b is an example of a second moisture permeable member separating the second cathode gas flow path from the cathode off-gas flow path. Further, the moisture permeable membrane 71b has a planar shape, its one side defines the second cathode gas flow channel, and the planer surface of the planar shape intersects the horizontal direction and extends to the cooling portion 60.

In such a manner, the cathode gas flows on one side of the moisture permeable membrane 71b and the cathode off-gas flows on the other side of the moisture permeable membrane 71b, which humidifies the cathode gas. Further, the moisture permeable membrane 71b has a flat shape in which its planar direction intersects X direction and Y direction that are the horizontal direction, and the flat shape extends to the cooling portion 60. For this reason, the condensed water adhering to the surface of the moisture permeable membrane 71b, along which the cathode gas flows, drops to the virtually downward side, which ensures the drainage of the moisture permeable membrane 71b.

In this variation, the planar direction of the moisture permeable membrane 71b is included in the vertical direction, but is not limited thereto. Even in a case where the planar direction of the moisture permeable membrane 71b is inclined with respect to the vertical direction, the planar direction may be any direction that intersects the horizontal direction and extends to the cooling portion 60. In this variation, the pressure regulating pipe 55d and the check valve 55e are not provided unlike the above-described embodiment, but they may be provided.

Although some embodiments of the present invention have been described in detail, the present invention is not limited to the specific embodiments but may be varied or changed within the scope of the present invention as claimed.

In the embodiment and the variations, the cooling water for cooling the fuel cell 20 is used as the coolant of the cooling portion 60, but the present invention is not limited thereto. For example, cooling water for cooling electronic components other than the fuel cell 20 may be used as the coolant of the cooling portion 60. Further, the cooling portion 60 may be an air-cooling type using air as a coolant.

What is claimed is:

1. A cooling and humidifying device comprising:
    a cooling portion including: a coolant flow path through which a coolant flows; a first cathode gas flow path through which cathode gas to be supplied to a fuel cell flows; and a partition wall separating the coolant flow path from the first cathode gas flow path, the cooling portion configured to cool the cathode gas by exchanging heat between the cathode gas and the coolant;
    a humidifying portion including: a second cathode gas flow path through which the cathode gas flows; a cathode off-gas flow path through which cathode off-gas discharged from the fuel cell flows; and at least one of first and second moisture permeable members each separating the second cathode gas flow path from the cathode off-gas flow path, the humidifying portion configured to humidify the cathode gas by use of moisture contained in the cathode off-gas; and
    a case including a cathode gas inlet communicating with the first cathode gas flow path, and housing the cooling portion and the humidifying portion such that the first and second cathode gas flow paths communicate with each other and that the second cathode gas flow path is positioned vertically above the first cathode gas flow path,
    wherein
    the first moisture permeable member has a tubular shape defining the second cathode gas flow path on an inside of the first moisture permeable member, and an axial direction of the tubular shape intersects a horizontal direction and extends toward the cooling portion,
    the second moisture permeable member has a planar shape defining the second cathode gas flow path on one side of the second moisture permeable member, and a planar surface of the planar shape intersects the horizontal direction and extends toward the cooling portion,
    the case includes a lower wall positioned vertically below the cooling portion, and
    the cathode gas inlet is positioned vertically above at least a part of an inner surface of the lower wall and vertically below the cooling portion,
    wherein the lower wall includes a water storage portion including a recessed portion recessed vertically downward.

2. The cooling and humidifying device of claim 1, further comprising a first drain valve discharging water, stored on the lower wall, to an outside of the case.

3. The cooling and humidifying device of claim 1, further comprising a first drain valve draining water, stored in the water storage portion, to an outside of the case.

4. The cooling and humidifying device of claim 2, further comprising a sensor detecting an amount of water stored on the lower wall,
    wherein the first drain valve is controlled to open and close according to a detection result of the sensor.

5. The cooling and humidifying device of claim 1, wherein
    the case includes an off-gas inlet and an off-gas outlet communicating with the cathode off-gas flow path,
    the humidifying portion includes an off-gas flow path bottom surface defining the cathode off-gas flow path, and
    the off-gas flow path bottom surface is inclined diagonally downward from the off-gas inlet to the off-gas outlet.

6. The cooling and humidifying device of claim 1, wherein
    the case includes an off-gas outlet communicating with the cathode off-gas flow path,
    the humidifying portion includes an off-gas flow path bottom surface defining the cathode off-gas flow path, and
    the off-gas outlet is provided at a height equal to or lower than a height of the off-gas flow path bottom surface.

7. The cooling and humidifying device of claim 1, further comprising a second drain valve discharging water from the cathode off-gas flow path to an outside of the case.

8. The cooling and humidifying device of claim 1, wherein the coolant cools the fuel cell.

9. A fuel cell system comprising:
    a fuel cell; and
    a cooling and humidifying device,
    wherein
    the cooling and humidifying device includes:
        a cooling portion including: a coolant flow path through which a coolant flows; a first cathode gas flow path through which cathode gas to be supplied to the fuel cell flows; and a partition wall separating the coolant flow path from the first cathode gas flow path, the cooling portion configured to cool the cathode gas by exchanging heat between the cathode gas and the coolant;
        a humidifying portion including: a second cathode gas flow path through which the cathode gas flows; a cathode off-gas flow path through which cathode off-gas discharged from the fuel cell flows; and at least one of first and second moisture permeable members each separating the second cathode gas flow path from the cathode off-gas flow path, the humidifying portion configured to humidify the cathode gas by use of moisture contained in the cathode off-gas; and a case including a cathode gas inlet communicating with the first cathode gas flow path, and housing the cooling portion and the humidifying portion such that the first and second cathode gas flow paths communicate with each other and that the second cathode gas flow path is positioned vertically above the first cathode gas flow path, the first moisture permeable member has a tubular shape defining the second cathode gas flow path on an inside of the first moisture permeable member, and an axial direction of the tubular shape intersects a horizontal direction and extends toward the cooling portion, the second moisture permeable member has a planar shape defining the second cathode gas flow path on one side of the second moisture permeable member, and a planar surface of the planar shape intersects the horizontal direction and extends toward the cooling portion, the case includes a lower wall positioned vertically below the cooling portion, and the cathode gas inlet is positioned vertically above at least a part of an inner surface of the lower wall and vertically below the cooling portion, wherein the lower wall includes a water storage portion including a recessed portion recessed vertically downward.

* * * * *